[11] 3,602,685

| | | | |
|---|---|---|---|
| [72] | Inventor | Fujio R. Itoh |  |
| | | Wilkinsburg, Pittsburgh, Pa. | |
| [21] | Appl. No. | 561,252 | |
| [22] | Filed | June 28, 1966 | |
| [45] | Patented | Aug. 31, 1971 | |
| [73] | Assignee | United States Atomic Energy Commission | |

[54] METHOD OF ELECTRON-BEAM WELDING
5 Claims, 27 Drawing Figs.

[52] U.S. Cl. .................................................. 219/121, 219/117
[51] Int. Cl. ............................................... B23k 9/00
[50] Field of Search .................................... 219/121 EB, 50, 69, 121, 121 L, 117; 250/49.5; 313/82.1

[56] References Cited
UNITED STATES PATENTS

| 2,793,282 | 5/1957 | Steigerwald ................. | 219/121 |
| 3,033,974 | 5/1962 | Schleich et al ................ | 219/121 |
| 3,156,809 | 11/1964 | Sterns .......................... | 219/121 |
| 3,328,556 | 6/1967 | Nelson et al. ................ | 219/125 |
| 3,378,670 | 4/1968 | Smith et al. ................... | 219/121 |

FOREIGN PATENTS

| 1,010,307 | 11/1965 | Great Britain ................ | 219/121 |
| 1,401,318 | 4/1965 | France .......................... | 219/121 |

*Primary Examiner*—Richard M. Wood
*Assistant Examiner*—W. Dexter Brooks
*Attorney*—Roland A. Anderson ABSTRACT: A method of electron-beam welding is disclosed, particularly for welding alloys such as ZIRCALOY-2 or -4. Narrow, deep welds of minimal porosity are produced by defocusing the beam at its point of impingement on the joint. A short, narrow dike is provided on the surface of the joint within which pressure of the molten metal is built up. This pressure suppresses appreciable loss of alloying components from the weld metal.

PATENTED AUG 31 1971

WITNESSES
Theodore F. Wrobel
James F. Young

INVENTOR
Fujio R. Itoh
BY
Wymer Diamond
ATTORNEY

INVENTOR.
Fujio R. Itoh
BY
ATTORNEY

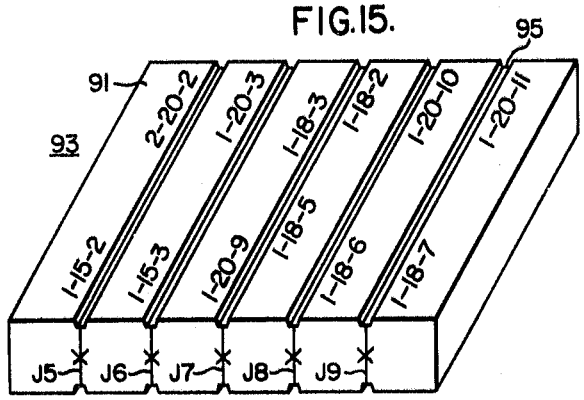
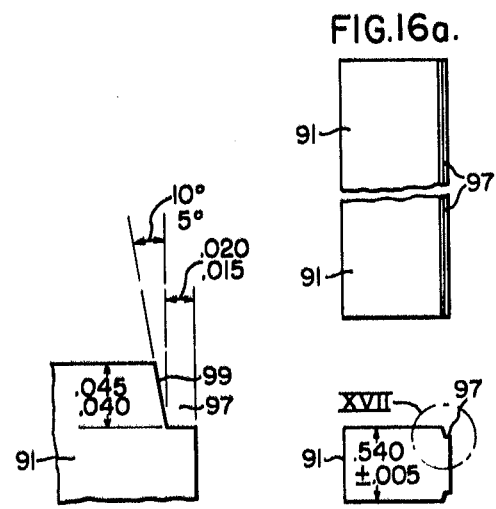
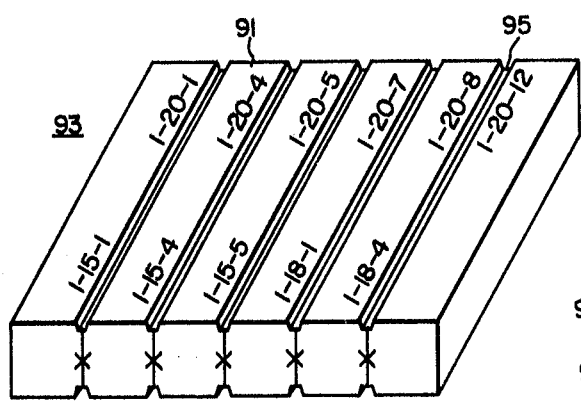
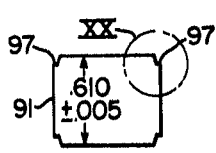
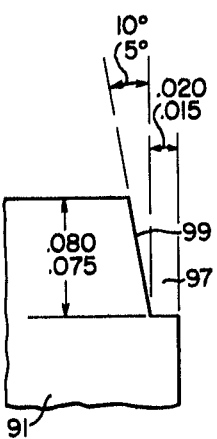
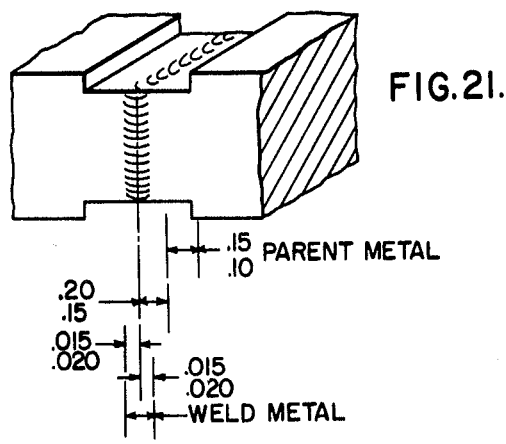

METHOD OF ELECTRON-BEAM WELDING

This invention relates to welding and has particular relationship to electron-beam welding. In the electron-beam welding of work in which the weld does not penetrate entirely through the work root porosity in the welds has been encountered. It is an object of this invention to provide a method of electron-beam welding in which this porosity shall be suppressed.

Porosity is encountered in electron-beam welding principally in producing welds having a high depth-to-width ratio. In producing such welds the power density; that is, the megawatts per unit area, on the portion of the work impinged by the beam, is high. In welding with high power density, the beam penetrates deeply into the work in a short time interval producing pockets filled with metallic vapor. As the welding proceeds the beam moves relative to the work and the fused metal from which the beam has advanced solidifies in a very short time. It has been realized that the vapor in the pockets condenses as the metal freezes and the pockets, now empty, are locked into the solidified metal forming the porosity.

Attempts have been made to suppress the porosity by reducing the power density of the electron-beam impinging on the work. This object may be accomplished by defocusing the electron beam with reference to the work so that the beam is focused above the surface of, or within, the work and the area impinged by the beam is substantially increased. A generally analogous result would be achieved with a low voltage (15,000 to 30,000 volts) electron-beam. To achieve the required penetration, in welding in this way with a defocused or a low power-density beam, the actual power of the beam in producing a weld of predetermined dimensions must be as high or higher than the total power for a high power-density beam. Electron-beam welding of alloys with a defocused relative low power-density beam has resulted in welds which are free of the porosity but in whose weld metal the alloying components are substantially depleted. It is an object of this invention to overcome this disadvantage and to provide a method of welding in the practice of which the welds produced shall be free of porosity and the content of the alloying components shall be preserved.

Typically, this invention concerns itself with a welding of zirconium alloys usually referred to as ZIRCALOY alloy. Table I below shows the compositions of the alloys ZIRCALOY-2 and ZIRCALOY-4. In the welding of these alloys, it is essential that the alloy content of the various constituents be preserved and this object is accomplished in the practice of this invention.

Table I

| Element | Zircaloy-2 | Zircaloy-4 |
|---|---|---|
| Tin | 1.20 to 1.70 | 1.20 to 1.70 |
| Iron | 0.07 to 0.20[1] | 0.18 to 0.24[2] |
| Chromium | 0.05 to 0.15[1] | 0.07 to 0.13[2] |
| Nickel | 0.03 to 0.08[1] | 0.007 maximum |
| Zirconium | Remainder | Remainder |

[1] The sum of the iron, chromium and nickel contents for each location shall fall within the range of 0.18 to 0.38 percent.
[2] The sum of the iron and chromium contents for each location shall fall within the range of 0.28 to 0.37 percent.

It has been discovered that if the iron and chromium components of the Zircaloy alloys are preserved, the other alloy components are also preserved. This application accordingly deals principally with the preservation of iron and chromium.

In accordance with this invention the alloy depletion is suppressed by providing a recess or dike about the surface on which the electron beam impinges during the welding operation. The effect of the dike is to impede the flow of the vapor produced by the electron beam during the welding operation away from the pool of fused metal. The vapor pressure over the pool is then increased preventing the evaporation of material from the pool and the depletion of the alloy content.

For a more complete understanding of this invention, both as to its organization and as to its method of operation, together with additional objects and advantages thereof, reference is made to the following description taken in connection with the accompanying drawings; in which, FIG. 1 is a generally diagrammatic view of an electron-beam welder used in the practice of this invention;

FIGS. 9b, 10b and 11b are views in end elevation of the specimens in FIGS. 9a, 10a and 11a;

FIG. 12b is a view in end elevation of the specimens shown in FIG. 12a;

FIG. 15 is a view in perspective showing a specimen comprising a plurality of blocks forming joints welded in the practice of this invention;

FIG. 16a is a view in plan of an end block of the assembly shown in FIG. 15;

FIG. 16b is a view in end elevation of the block shown in FIG. 16a;

FIG. 17 is a view in end elevation enlarged of the portion of the block in the circle XVII of FIG. 16b;

FIG. 18 is a view in perspective of a specimen including a plurality of blocks forming joints welded in the practice of this invention;

FIG. 19 is a view in end elevation of one of the intermediate blocks of FIG. 18;

FIG. 20 is a view in side elevation enlarged of the portion of the block shown in FIG. 19 enclosed in circle XX;

FIG. 21 is a view enlarged of a portion of a weld of the block shown in FIG. 18 showing the portion of the weld metal and related metal removed for chemical analysis.

Figure 1:
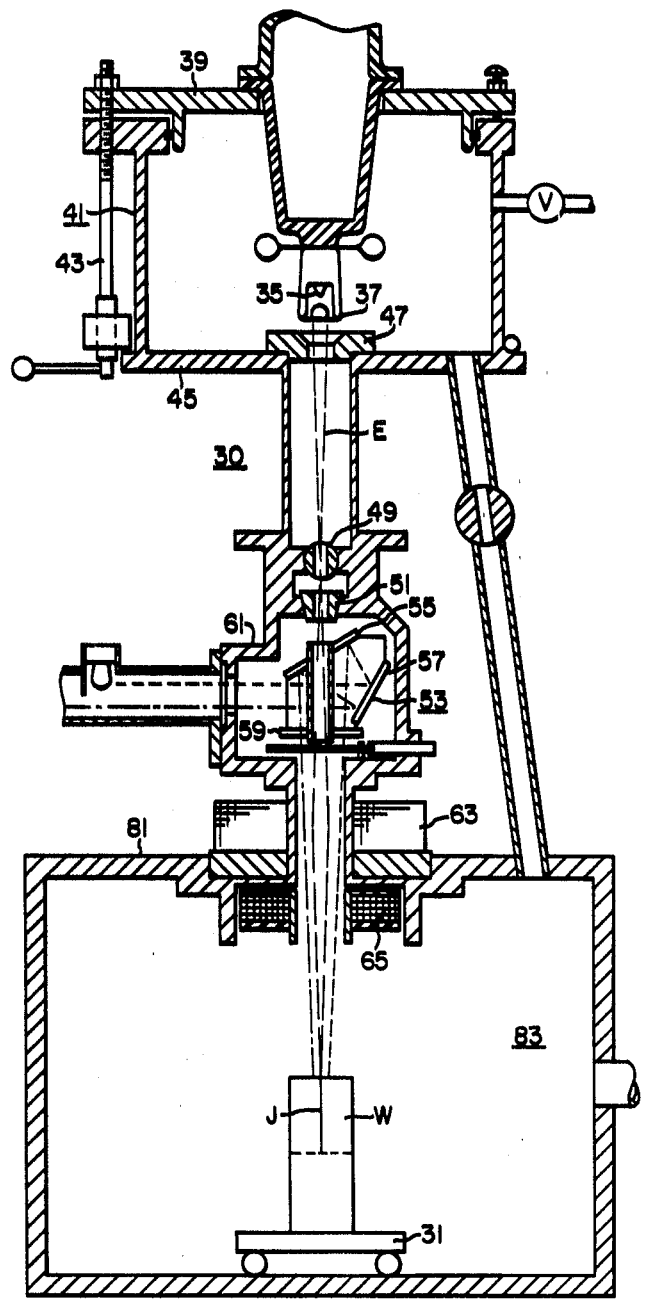
Figure 4:
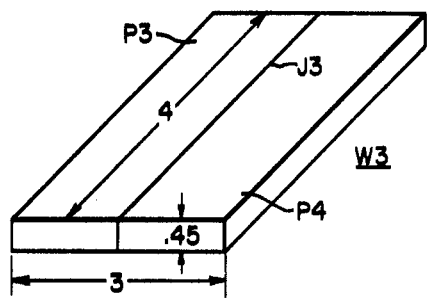
FIG. 4 is a view in perspective showing specimen plates forming a butt joint preparatory to a welding operation with a defocused beam.

The apparatus shown in FIG. 1 is an electron-beam welder including an electron-gun column assembly 30 maintained evacuated to a low pressure, typically 0.01 microns, by a powerful evacuation system (not shown). An electron beam E is projected through the chamber on work W mounted on a movable platform 31. The electron beam E is derived from a cloud of electrons vaporized from a heated cathode 35. The flow of the electrons is controlled by a grid 37 on which an appropriate controlling potential is impressed. The cathode-grid assembly is suspended from a cover 39 for the electron gun portion 41 of the column assembly 30 which is generally cupshaped. This cover is sealed vacuumtight to the portion 41 but can be tilted by rotation of two adjusting shafts 43 to set the position of the cathode-grid assembly with respect to the anode. In the base 45 of the electron-beam gun portion 41 an annular-shaped ring which serves as the anode 47 is mounted. A high accelerating potential which accelerate the electrons thus forming a beam is impressed between the cathode 35 and the anode 47.

The beam passes through a column including a shutoff valve 49 a diaphragm 51 and an optical system 53. The optical system includes a plurality of mirrors 55, 57, 59 for projecting an image of the spot produced by the beam on the work W through a viewer column 61 through which an operator may view the beam. The apparatus is also provided with a magnetic lens assembly 63 for focusing the beam E and deflection coils 65 through which current is passed to generate magnetic fields for setting the beam on a joint J to be welded or for deflecting the beam back and forth across the joint. The deflection is effected by the passing of either an alternating or constant current through the deflection coils 65. Provisions (not shown) are included for setting the waveform of the alternating potential to achieve any desired beam intensity pattern on the work. For example, the deflection may be largely sinusoidal in which case the beam E periodically dwells at the extreme ends of the joint J or it may be generally sawtoothed or triangular in which case the beam E does not dwell materially at any point of the work W.

In the use of the apparatus shown in FIG. 1 the beam is focused on the joint J of the work W and the work is moved relative to the beam as the beam impinges on the joint J to produce the weld. During the welding operation, the beam may be oscillated back and forth about the joint j by impressing an appropriate alternating potential on the deflecting coils 65.

Figure 2:
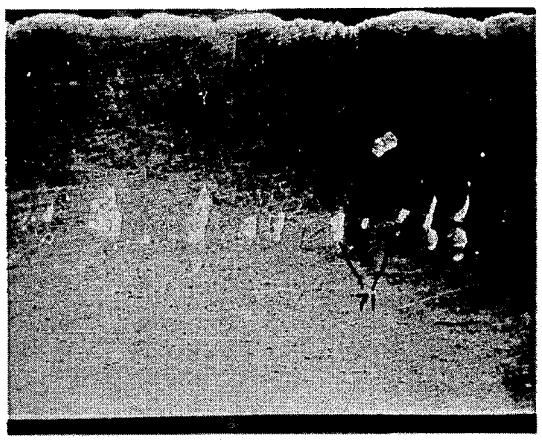
FIG. 2 is a photomacrograph of a cut longitudinally of a weld produced with a high power-density electron beam in accordance with the teachings of the prior art showing the porosity produced.
Figure 3:
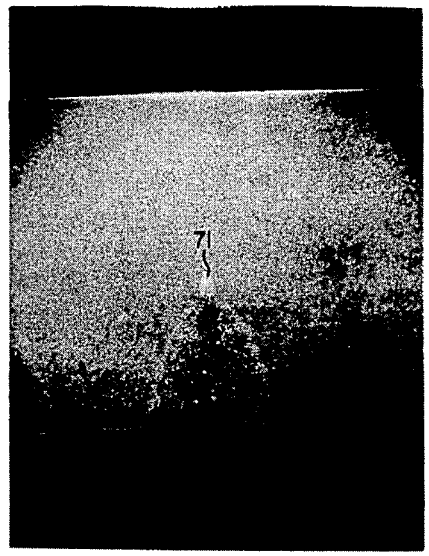
FIG. 3 is a photomacrograph of a transverse cut of the weld shown in FIG. 2.

Typically a potential of between 90 and 100 kilovolts is impressed between the anode 47 and cathode 35 to produce the electron beam E and the focusing lens assembly 63 is supplied with current to focus the beam on the joint J at the point of the work W where the beam E impinges. Under such circumstances, the power density at the point where the beam impinges is high and a narrow deep weld as shown in FIG. 3 is produced. But in this use of the apparatus shown in FIG. 1, root porosity has been encountered in welds so produced. Typical cavities 71 manifesting root porosity are shown in FIGS. 2 and 3. The root porosity 71 may be eliminated by reducing the power density of the beam E; for this purpose the beam is defocused. The spot produced by the beam at the point where it impinges on the work W is then of substantial area, and, to achieve the desired depth of penetration, it is necessary that the total power supplied to produce the weld be substantially increased. While the reduction of the power density results in a substantial elimination of the porosity there is an accompanying loss of alloying constituents in the weld metal.

During the welding the metal in the region where the beam impinges is vaporized. A portion of the base material is vaporized out of the system as the evacuation system operates to maintain the vacuum while the welding is progressing. Certain alloying components are selectively removed from the weld metal in this way presumably acting within principals governing partial pressures.

Figure 6:
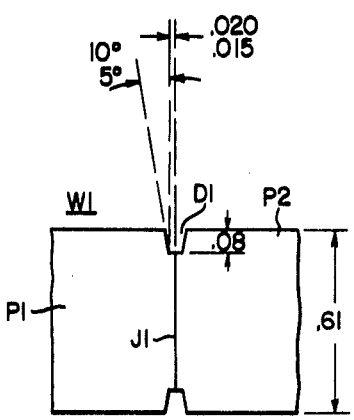
FIG. 6 is a fragmental view in side elevation of a specimen of plates forming a butt joint to be welded in the practice of this invention.
Figure 7:
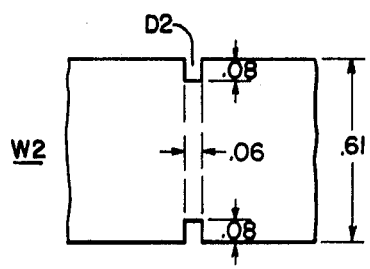
FIG. 7 is a view in side elevation of a specimen in which a weld bead is to be produced in the practice of this invention.

In accordance with this invention, the content of the alloying components in the weld metal is preserved by providing a dike about the region where the welding is to take place. FIG. 6 shows work W1 to be butt welded in the practice of this invention. In this case the work consists of parts P1 and P2 forming between them a joint J1 where the weld is to be produced. Each part P1 and P2 is provided with a groove at each surface adjacent the joint J1. With the parts P1 and P2 abutted a dike or groove D1 is formed between the grooves above the region where the beam is to impinge. In the work W1 shown in FIG. 6 the walls of the dike D1 are tapered. Typically, the dike D1 may have the dimensions shown in FIG. 6. Work W2 with a dike D2 prepared for depositing a weld bead in accordance with this invention is shown in FIG. 7. The walls of the dike D1 or D2 in each case restrict the flow of vapor from the pool produced by the beam E increasing the vapor pressure and preventing the depletion of the alloying components.

In arriving at this invention, the weld-metal composition of welds produced with work W1 and W2 was compared with the weld-metal composition of welds produced with work W3 consisting of abutting parts P3 and P4 forming a joint J3. The work W1, W2 and W3 was composed of ZIRCALOY-4 alloy. Work W3 was welded with a defocused beam.

Figure 5:
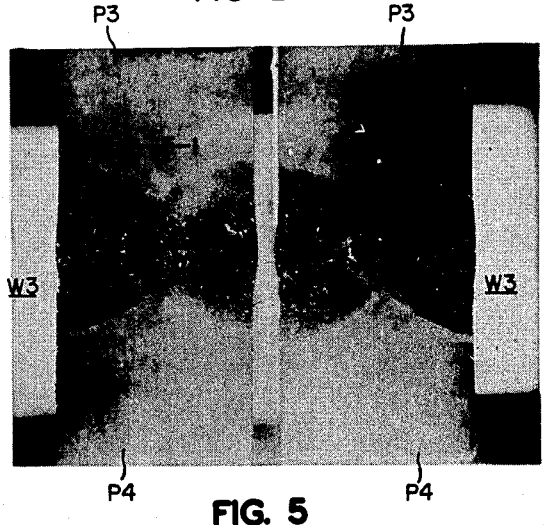
FIG. 5 is a photomacrograph of a transverse cut through welds produced at joints as shown in FIG. 4.
Figure 8:
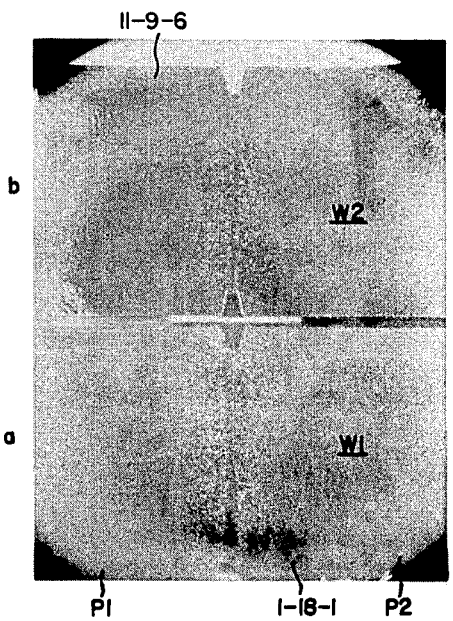
FIG. 8a is a photomacrograph of a cut transversely through the weld produced with a specimen shown in FIG. 6.
FIG. 8b is a like photomacrograph of the specimen shown in FIG. 7.

FIG. 5 presents photographs of cuts of welds produced with work W3. For the purpose of correlating analyses, these welds are identified 8-4-1 and 8-5-1 respectively. FIGS. 8a, and 8b, present photographs of cuts through welds produced with work W1 and W2 respectively; that is in accordance with this invention. These welds are identified 1-18-1 and 11-9-6 respectively.

Table 1A below shows the parameters or settings of the apparatus shown in FIG. 1, for these welds, the iron and chromium analyses for the parent metal and the weld metal, and the X-ray quality of each weld. Previous experience has shown that sufficient data in regards to the chemical properties can be had by measuring only the content of the iron and chromium. The depletion of these two in general gives the trend in regards to the tin and nickel.

TABLE IA

Weld Parameters

| Welds | 8-4-1 | 8-5-1 | 11-9-6 | 1-18-1 |
|---|---|---|---|---|
| Beam volts, kv | 120 | 90 | 90 | 90 |
| Beam current, ma | 20 | 20 | 20 | 13.2 |
| Lens current, amps | 0.530 | 0.438 | 0.518 | 0.530 |
| Defl.: | | | | |
| Div | 9 | 0 | 0 | 0 |
| Har | 10 | | | |
| Dist. (in.) | 10 | 10 | 5 | 8 |
| Speed, i.p.m | 15 | 10 | 10 | 5 |

Chemistry

| Fe (Iron): | | | | |
|---|---|---|---|---|
| Parent | .270 / .283 | .216 | .209 | .200 |
| Weld | .233 | .198 | .211 | .200 |
| Cr (chromium): | | | | |
| Parent | .118 | .116 | .092 | .090 |
| Weld | .092 | .086 | .084 | .084 |

X-ray quality

| X-ray observation | (1) | (2) | (3) | (2) |
|---|---|---|---|---|

[1] Center line porosity. [2] Clean. [3] 2-spots.

In the first row in Table I, the welds are identified, the second row gives the beam voltage; the third row the beam current. The focusing current supplied to the lens assembly 63 is given in the fourth row; the higher the focusing current at any beam voltage, the higher the focusing point and for the work described here the more the defocusing. The fifth row gives the amplitude of deflection of the beam; the beam was deflected only for weld 8-4-1. The number 9 signifies that the amplitude was 9×0.013 inches or 0.117 inches. The next line gives the harmonic content of the deflection potential; the number 10 indicates a third harmonic so that a small extent of flatness was imparted to the deflecting potential. The next row, "Dist(In)," gives the distance in inches between the inner surface of the top 81 of the work chamber 83 of FIG. 1 and the surface of the work welded. This distance is correlated with the focusing current (fourth row) to set the extent of defocusing of the beam. The speed of the work relative to the beam in inches per minute is given in the next row. The analyses for iron parent and weld metal is given in the 9th and 10th rows respectively and for chromium in the 11th and 12th rows respectively. The 13th rows gives the quality of the weld as determined by X-ray analysis. Welds 8-5-1 and 1-18-1 were clean and 11-91-6 had minor porosity.

Table IA demonstrates the success of applicant's invention. The alloy depletion for the diked welds was small 0.002 and 0.000 for iron and 0.008 and 0.006 for chromium as compared to 0.050 and 0.018 and 0.026 and 0.030 respectively.

EXAMPLES

Figure 9A:
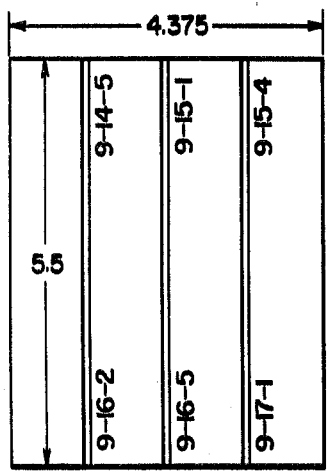
FIGS. 9a, 10a and 11a are respectively plan views of three specimens on which weld deposits were made in the practice of this invention.
Figure 10A:
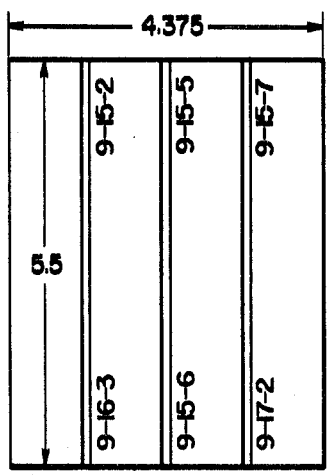
Figure 11A:
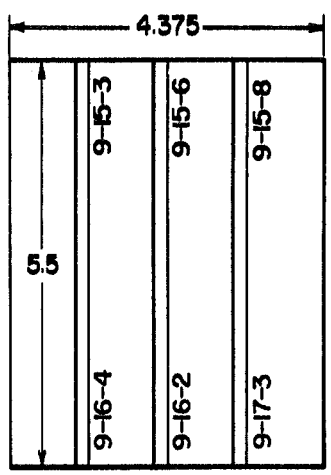
Figure 9B:
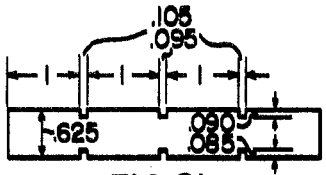
Figure 10B:
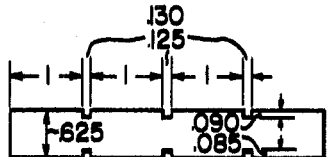
Figure 11B:
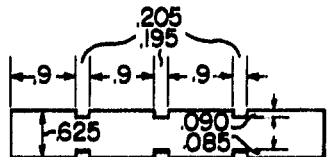

FIGS. 9a,b, 10a,b and 11a,b show the important dimensions of specimens on which weld beads were deposited by electron-beam welding in the practice of this invention. For all specimens the dike had a depth of 0.085 to 0.090 inches. For FIG. 9a,b the width of the dikes was 0.095 and 0.105 inches. For the specimen 10a,b the width was between 0.125 and 0.130 inches and for the specimen 11a,b the width was between 0.195 and 0.205 inches. The dikes in each of the specimens are labeled at both ends to identify the regions from which samples were taken to study the alloy depletion and the other properties of the weld metal and the related parent metal.

Table II below shows the parameters of the welding operations in depositing the beads on the specimens shown in FIGS. 9a,b, 10a,b, and 11a,b.

TABLE II

| Welds | Beam volts in kv. | Beam current in ma. | Lens current in amps | Deflection Div. | Deflection Har. | Dist. (in.) | Speed, i.p.m. | Identification |
|---|---|---|---|---|---|---|---|---|
| 9-14-5 | 90 | 20 | .518 | 0 | | 5 | 10 | A |
| 9-15-1 | 90 | 20 | .518 | 0 | | 5 | 10 | A |
| 9-15-2 | 90 | 20 | .518 | 0 | | 5 | 10 | A |
| 9-15-3 | 90 | 20 | .518 | 0 | | 5 | 10 | A |
| 9-15-4 | 110 | 20 | .600 | 5 | 10 | 5 | 12½ | B |
| 9-15-5 (5-A) | 110 | 20 | .600 | 5 | 10 | 5 | 12½ | B |
| 9-15-6 | 110 | 20 | .600 | 5 | 10 | 5 | 12½ | B |
| 9-15-7 | 110 | 20 | .600 | 9 | 10 | 5 | 12½ | C |
| 9-15-8 | 110 | 20 | .600 | 9 | 10 | 5 | 12½ | C |

The columns in Table II give the same data as the correspondingly identified rows of Table IA.

The following Table III shows the analyses for iron and chromium in the parent metal and in the weld metal and the depletions for the various welds.

TABLE III

| | Channels | | | | | | | | |
|---|---|---|---|---|---|---|---|---|---|
| | 5 | 1 | 2 | 3 | 4 | 5; 5-A | 6 | 7 | 8 |
| Channel width | .100 | .100 | .125 | .200 | .100 | .125 | .200 | .125 | .200 |
| Weld parameters (set) | A | A | A | A | B | B | B | C | C |
| Fe (iron): | | | | | | | | | |
| Parent | .134 | .134 | .136 | .137 | .133 | .132 | .134 | .135 | .134 |
| Weld | .133 | .133 | .130 | .125 | .138 | .133 | .123 | .133 | .132 |
| Δ | .001 | .001 | .006 | .012 | −.005 | −.001 | .011 | .002 | .002 |
| Cr (chromium): | | | | | | | | | |
| Parent | .092 | .092 | .094 | .096 | .092 | .096 | .092 | .094 | .092 |
| Weld | .080 | .080 | .080 | .072 | .080 | .081 | .072 | .072 | .084 |
| Δ | .012 | .012 | .014 | .024 | .012 | .015 | .020 | .022 | .088 | the first row of Table III identifies the welds. The numbers "1," "2," "3" etc. are the last numbers of the 9-15 identification; that is, the "1" represents welds 9-15-1 and the others correspond. In the second row in each case, the nominal channel widths are given. That is, channel width between 0.095 and 0.105 is presented as 0.100 and the others are correspondingly presented. In the third row, the identification in the extreme right-hand column of Table II is presented to indicate what parameters were used in producing the welds analyzed. The other columns give the iron and chromium analyses of the parent metal and the weld metal and the depletion, or change in the iron and chromium. It is seen that in each case the change is relatively small.

EXAMPLE II

Figure 12A:
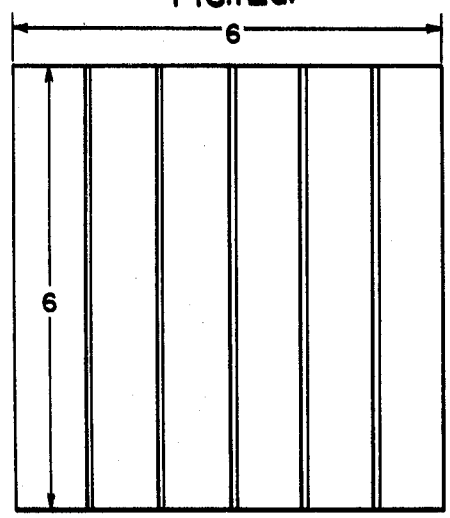
FIG. 12a is a plan view of another specimen on which deposits were made in the practice of this invention.
Figure 12B:
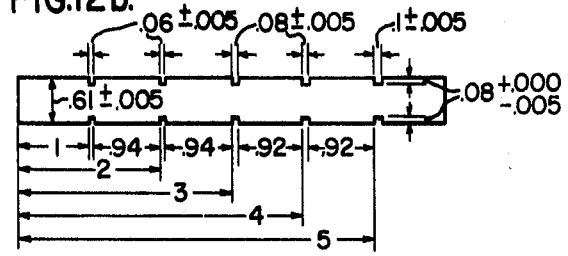

FIGS. 12a and 12b show the principal dimensions of a specimen on which a plurality of weld deposits were made in the practice of this invention. In this case, the depth of all dikes was 0.080 inches. Table IV below shows the weld parameters used in making the welds.

TABLE IV

| | KV | MA | Lens Current Amps | Speed IPM | Dist. (In) | X-ray |
|---|---|---|---|---|---|---|
| 11-6-5 | 90 | 20 | 0.518 | 10 | 5 | Spotty |
| 11-6-6 | 90 | 20 | 0.518 | 10 | 5 | 2-spots |
| 11-6-7 | 90 | 20 | 0.518 | 10 | 5 | Clean |
| 11-9-10 | 90 | 20 | 0.578 | 10 | 5 | Spotty |

These welds were made without deflecting the electron beam. The last column of Table IV shows the results of X-ray analysis. The indication "Clean" means that the corresponding weld was entirely free of porosity as viewed by radiography. The indication "Two spots" means that there were only two porosity spots.

Figure 13:
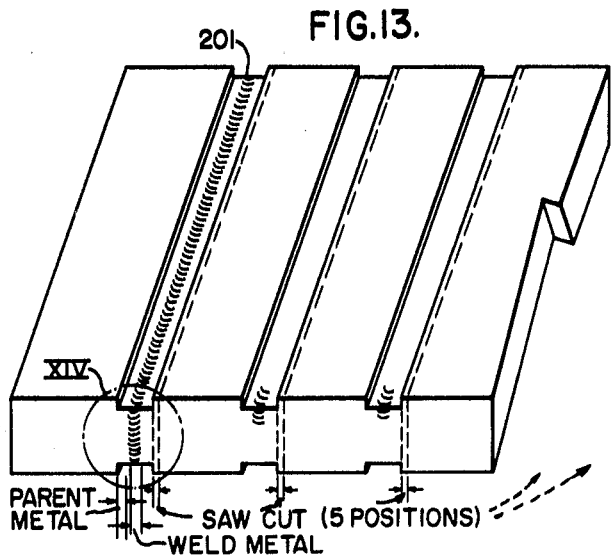
FIG. 13 is a view in perspective showing the specimens shown in FIGS. 12a and 12b after the deposit is made.
Figure 14:
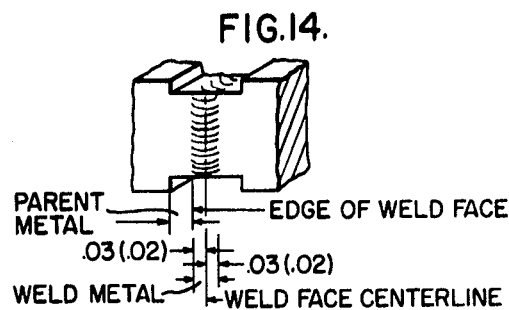
FIG. 14 is an enlarged view of the portion of the specimens shown in FIG. 13 which is enclosed in the circle XIV.

FIGS. 13 and 14 show portions of the weld bead and the adjacent metal which were chemically analyzed. The grooves 201 of FIG. 13 are wide because a portion of the weld metal has been removed to facilitate radiography.

Table V below shows the iron and chromium depletions.

TABLE V

| No. | Sample Identification | Elements to be Determined | | | |
|---|---|---|---|---|---|
| | | % Fe | % Cr | Fe | Cr |
| 01 | Weld 11-6-5 | 0.204 | 0.080 | 0.004 | 0.012 |
| 02 | Parent 11-6-5 | 0.208 | 0.092 | | |
| 03 | Weld 11-6-6 | 0.209 | 0.084 | 0.002 | 0.008 |
| 04 | Parent 11-6-6 | 0.211 | 0.092 | | |
| 05 | Weld 11-6-7 | 0.206 | 0.084 | 0.005 | 0.008 |
| 06 | Parent 11-6-7 | 0.211 | 0.092 | | |
| 07 | Weld 11-9-10 | 0.209 | 0.084 | 0.084 | 0.008 |
| 08 | Parent 11-9-10 | 0.211 | 0.092 | | |

For each of the welds analyzed the first row gives the iron and chromium for the weld metal and the second row the iron and chromium for the parent metal. The fifth column in each case gives the change in the iron and sixth column the change in the chromium. The table reveals that the alloying components were substantially preserved.

EXAMPLE III

FIG. 15 shows a specimen produced in the practice of this invention. In this case, a plurality of blocks 91 were welded into a larger block 93. In each case a dike 95 was provided about the joints J5 through J9 between the blocks. The dikes are labeled at both ends to identify the regions from which welds or parent metal was removed for analysis.

FIGS. 16a and 16b show a plan view and a view in end elevation of one of the end blocks 91 prior to the welding. FIG. 17 shows the dimensions of the groove 97 of this block which, when the block and the adjacent one are abutted, form the dike 95. In the case illustrated, the sidewalls 99 of the dikes 95 are at a small angle to the dimension generally parallel to the weld.

FIGS. 18, 19 and 20 show the dimensions and identifications of a second set of blocks 95 welded into a larger block. The dimensions of the grooves 97 of the blocks 91 which form the dike 95 are shown in FIG. 20. FIG. 21 shows the regions from which the weld metal and the parent metal were removed for analysis for each of the blocks shown in FIGS. 15 through 20.

The following Table VI shows the weld parameters used in welding together the various blocks.

TABLE VI

| | Kv. | Ma. | Lens H-S, amp | Pot | Defl. Div. | Defl. Har. | I.p.m. | Dist., inches | J+ Thk.* inches | X-Ray |
|---|---|---|---|---|---|---|---|---|---|---|
| 1-15-1 | 110 | 10.2 | .599 | 676 | | | 15 | 5 | .450/.610 | 2 or 3 spots. |
| 1-15-2 | 110 | 10.2 | .599 | 676 | | | 15 | 5 | .450/.540 | Do. |
| 1-15-3 | 100 | 10.5 | .565 | .554 | | | 8 | 5 | .450/.540 | Clean. |
| 1-15-4 | 100 | 10.5 | .565 | .554 | | | 8 | 5 | .450/.610 | Do. |
| 1-15-5 | 90 | 15.2 | .520 | 520 | | | 8 | 5 | .450/.610 | Spots throughout. |
| 1-18-1 | 90 | 13.2 | .530 | 532 | | | 8 | 5 | .450/.610 | Clean. |
| 1-18-4 | 100 | 20 | .567 | 560 | | | 20 | 5 | .450/.610 | Spots throughtout. |
| 1-18-5 | 110 | 8.3 | .595 | 582 | | | 8 | 5 | .450/.540 | Do. |
| 1-18-6 | 120 | 15 | .638 | 610 | | | 20 | 5 | .450/.540 | 4 or 5 spots. |
| 1-18-7 | 120 | 20 | .639 | 604 | | | 25 | 5 | .450/.540 | 2 or 3 spots. |

* The number to the left of the slant line is the thickness between the bases of opposite dikes 95 and the number to the right is the overall thickness of the work.

The welds are identified in the left-hand column by the identifications on the lower side of each of the joints. The column on the extreme right gives the results of X-ray analysis in each case. It is seen that all, of the welds analyzed by X-rays three were entirely clean of porosity and three had only two or three spots and one had four or five spots. Table VII below shows the depletion of iron and chromium in the weld metal at opposite ends of the welded blocks. It is seen that the depletion is relatively low.

TABLE VII

| No. | Sample identification | Percent Fe | Percent Cr | ΔFe | ΔCr |
|---|---|---|---|---|---|
| 01 | 1-15-1 parent metal | .200 | .088 | .000 | .002 |
| 02 | 1-15-1 weld metal | .200 | .090 | | |
| 03 | 1-15-2 parent metal | .227 | .088 | .000 | .004 |
| 04 | 1-15-2 weld metal | .227 | .084 | | |
| 05 | 1-15-3 parent metal | .233 | .086 | .006 | .006 |
| 06 | 1-15-3 weld metal | .227 | .080 | | |
| 07 | 1-15-6 parent metal | .203 | .090 | .007 | .002 |
| 08 | 1-15-6 weld metal | .193 | .088 | | |
| 09 | 1-15-5 parent metal | .200 | .090 | .000 | .004 |
| 10 | 1-15-5 weld metal | .200 | .086 | | |
| 11 | 1-18-1 parent metal | .200 | .090 | .000 | .006 |
| 12 | 1-18-1 weld metal | .200 | .084 | | |
| 13 | 1-18-4 parent metal | .200 | .092 | .007 | .006 |
| 14 | 1-18-4 weld metal | .193 | .086 | | |
| 15 | 1-18-5 parent metal | .227 | .086 | .027 | .006 |
| 16 | 1-18-5 weld metal | .200 | .080 | | |
| 17 | 1-18-6 parent metal | .227 | .084 | .000 | .004 |
| 18 | 1-18-6 weld metal | .227 | .080 | | |
| 19 | 1-18-7 parent metal | .227 | .084 | .000 | .004 |
| 20 | 1-18-7 weld metal | .227 | .080 | | |

Figure 22:
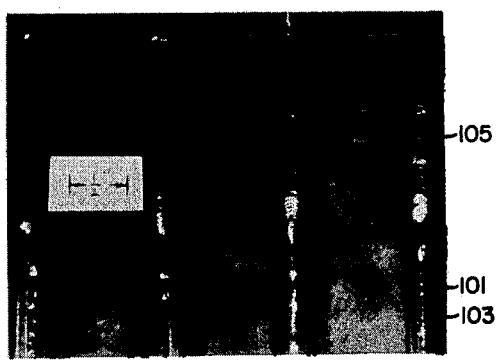
FIG. 22 is a photograph comparing weld beads made in the practice of this invention with weld beads made in accordance with the teachings of the prior art.

A remarkable feature of the welding in the practice of this invention is demonstrated in FIG. 22 which presents photographs of welds 101 produced in the practice of this invention with dikes 103 about the region to be welded and welds 105 produced without dikes. The welds 101 and 105 which are colinear were made in a single operation with the electron beam apparatus in a single predetermined setting so that the parameters for both welds 101 and 105 were identical. It is seen in the welds 105 produced without dikes 103 are relatively wide while for the welds 101 produced in the practice of this invention the weld bead is narrow and substantially smaller in width than the dike 103. The effect of the dike in constricting the weld bead is a remarkable phenomena.

The following brief summary may help in understanding this invention. This invention relates to a method for minimizing the loss of alloying constituents in weld material without leaving rot porosity in welds made by the electron beam process. In welds of the type under consideration there is generally not complete penetration of the fusion zone through the structure although welds in which there is complete penetration are within the scope of this invention to the extent that it is applicable.

The electron-beam welding of metals is accomplished by the bombardment of electrons near the interfaces or on the surface where a bead is to be deposited such that sufficient energy is generated for fusion to occur. Optimum control of the electron-beam can best be had within a vacuum. But welding in a vacuum lends itself to depletion of the alloying constituents in the weld zones through partial distillation of the various elements.

Weld parameters primarily electron density or power density can be adjusted so as to vary the weld-bead depth to width ratio. Welds of high power density have high depth-to-width ratios and in addition are characterized by only small amounts of depletion. But welds of this type as shown in FIGS. 2 and 3 may have porosity at the bead root. The porosity is believed to be a combination of an extremely high-power density which results in pockets filled with metallic vapor and a cooling rate so rapid as not to allow the vapor pocket to be filled before solidification of the metal occurs. By reducing electron-beam power density, welds can be made as shown in FIG. 5. The power density can be reduced by defocusing a high voltage beam or by using a low voltage beam. The power density of such a weld has been reduced to a level such that no porosity results at the root. The welds shown in FIG. 5, however, require more power to achieve the same depth of penetration as the welds shown in FIGS. 2 and 3. But, the welds of FIG. 5 result in a relatively high degree of losses of the alloying constituents, which is believed to be due to preferential distillation of the elements when the metal is in the liquid state. In addition, more liquid metal is exposed to the vacuum with a weld of the type shown in FIG. 5 than with one of the type in FIGS. 2 and 3. Thus in making joints of the type shown in FIGS. 2 and 3 or 5, a problem arises in that upon fusing the joint, one may be confronted with either weld nugget composed of depleted alloy material or a nugget with porosity along the root of the weld. Thus the invention is based on the realization that if the partial vapor pressures or tension over the pool melt can be increased over the type shown in FIG. 5, welds whose roots are imbedded in the parent metal can be made without leaving root porosity and without any losses of the alloying material.

According to this invention welds with imbedded bead roots are made without leaving porosity and with minimum losses in the alloying constituents by increasing the metallic vapor pressure or vapor tension over a weld pool generated by a low power density beam.

In the practice of this invention welds are made of the type shown in FIGS. 8a and 8b whereby porosity does not occur as shown in FIGS. 1 and 2 and the alloy depletion of welds shown in FIG. 5 is to be minimized.

A typical method for increasing the metallic vapor pressure is shown in FIGS. 6 and 7. The top of the joint is recessed below the neighboring surface to keep the weld pool confined, thus keeping the vapor pressure above the pool to a high value. In addition the recessed preparation may have some tendency to electrostatically focus the beam in some manner that aids to the process described herein (See FIG. 22). It has been shown by chemical analyses, along with radiograph and metallographical inspection, that with proper dimensional configurations of the recessed groove, welds with no bead root porosity and without alloy depletion can be made. This joint structure in effect confines the pool and increases the vapor pressure above the pool.

While preferred embodiments of this invention have been disclosed herein many modifications thereof are feasible. This invention then is not to be restricted except in accordance with the spirit of the prior art.

I claim:

1. The method of welding work by fusion welding with an electron beam which comprises causing said beam to impinge on said work in welding relationship, advancing said work relative to said beam to cause said beam so to impinge on said work at successive regions of said work to fuse, and partially vaporize the material of said work on which said beam impinges, and producing substantial pressure substantially only with the vapor of said vaporized material directly over the region over which said beam impinges on said work to suppress the distillation of alloying components from said work, said pressure being produced by a shallow dike which is provided at the surface of said joint on which said beam impinges and about the region where said beam impinges and said beam is caused to impinge on said joint within said dike and to remain within said dike, the depth and the width of said dike being such as to build up sufficient vapor pressure over the weld to suppress evaporation of alloying components from the joint during the welding.

2. The method of claim 1 wherein the beam has relatively low power density with respect to the region of the work on which it impinges.

3. Work to be fabricated by electron-beam fusion welding including work parts forming a joint to be welded between them, a dike about said joint for concentrating vapor pressure of the vapor from the weld above the joint where the beam impinges, said dike being narrow and its depth being small compared to the depth of the joint.

4. The method of claim 1 wherein the beam impinges on the work in an evacuated atmosphere.

5. The method of claim 1 wherein the depth of the dike is small compared to the depth of the joint measured along the direction transverse to the direction in which the work is advanced relative to the beam.